United States Patent [19]

Yale

[11] 3,960,847

[45] June 1, 1976

[54] 9-SUBSTITUTED-4-OXOPYRIDO(1,2-α)PYRIMIDINE-3-CARBOXYLIC ACIDS AND DERIVATIVES THEREOF

[75] Inventor: Harry Louis Yale, New Brunswick, N.J.

[73] Assignee: E. R. Squibb & Sons, Inc., Princeton, N.J.

[22] Filed: May 28, 1974

[21] Appl. No.: 473,637

Related U.S. Application Data

[63] Continuation-in-part of Ser. No. 244,955, April 17, 1972, abandoned.

[52] U.S. Cl............... 260/240 K; 260/251 A; 260/295 R; 260/296 R; 424/251
[51] Int. Cl.²................................. C07D 471/04
[58] Field of Search.......... 260/251 A, 240 J, 240 K

[56] References Cited
UNITED STATES PATENTS 3,585,198  6/1971  Meszaros et al.............. 260/251 A
3,642,797  2/1972  Lesher........................... 260/251 A

FOREIGN PATENTS OR APPLICATIONS 2,318,821  10/1973  Germany........................... 260/251

OTHER PUBLICATIONS

Lappin, J. Am. Chem. Soc., vol. 70, pp. 3348–3350 (1948).
Yale et al., J. Heterocyclic Chem., vol. 20, No. 2, 143–147, Apr. 1973.

Primary Examiner—Alton D. Rollins
Assistant Examiner—Diana G. Rivers
Attorney, Agent, or Firm—Lawrence S. Levinson; Merle J. Smith; Stephen B. Davis

[57] ABSTRACT

9-Substituted-4-oxopyrido[1,2-α]pyrimidine-3-carboxylic acids and related compounds are disclosed. In addition, their methods of preparation and use as central nervous system depressants and hypotensive agents are taught.

15 Claims, No Drawings

9-SUBSTITUTED-4-OXOPYRIDO(1,2-α)PYRIMIDINE-3-CARBOXYLIC ACIDS AND DERIVATIVES THEREOF

This application is a continuation-in-part of Ser. No. 244,955 filed on Apr. 17, 1972, now abandoned.

BACKGROUND OF THE INVENTION

While a large number of compounds are known which possess central nervous system depressant activity, most possess certain disadvantages, such as exhibiting a high order of toxicity, insufficient activity or a tendency to be habituating. Thus researchers are constantly re-examining known compounds or synthesizing new ones in order to find more satisfactory agents possessing central nervous system depressant activity.

This invention relates to new compounds possessing central nervous system depressant properties of the formula (I)

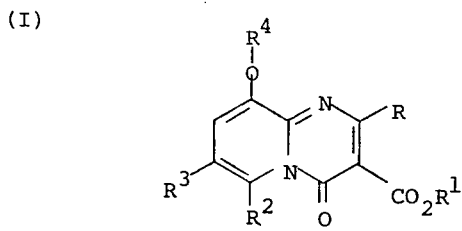

wherein R may be hydrogen or a straight or branched chain alkyl radical of from 1 to 4 carbon atoms, aryl of from 6 to 10 carbon atoms, or aralkyl of from 7 to 10 carbon atoms; $R^1$ is hydrogen or a straight or branched alkyl radical having from 1 to 4 carbon atoms; $R^2$ and $R^3$ may be hydrogen, alkyl of from 1 to 4 carbon atoms, $CF_3$, F, Cl or Br; $R^4$ may be
1. a substituted straight or branched chain alkyl radical of up to 10 carbon atoms which alkyl radical is substituted by phenyl or a substituted phenyl radical wherein the phenyl substituent is halogen, $CO_2$alkyl, CN, NC, $CF_3$, alkyl of 1 to 4 carbon atoms, alkoxy of 1 to 4 carbon atoms, alkylthio of 1 to 4 carbon atoms or dialkylsulfonamide wherein the dialkyl radicals have a total of 6 carbons;
2. a mono- or di-unsaturated straight or branched chain hydrocarbon radical of from 3 to 10 carbon atoms wherein the carbon atom attached to the oxygen atom is saturated;
3. a substituted mono- or di-unsaturated straight or branched hydrocarbon radical of from 3 to 10 carbon atoms wherein the carbon atoms attached to the oxygen atoms is saturated and which hydrocarbon radical is substituted by phenyl or a substituted phenyl radical wherein the phenyl substituent is as set forth previously, or by a halogen atom on a carbon atom carrying a double bond, and the pharmaceutically acceptable acid addition salts thereof, such as the hydrochloride, hydrobromide, sulfate, phosphate, maleate, fumarate, citrate, acetate, tartrate, etc. and salts useful in purifying said compounds, such as the oxalate salts and where $R^1$ is H, the pharmaceutically acceptable carboxylate slats, such as sodium, potassium, calcium, ammonium, etc.

The intermediates of the formulae:

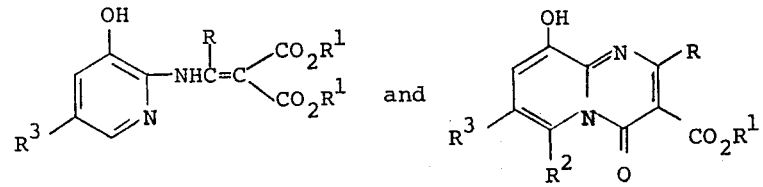

wherein R, $R^1$, $R^2$ and $R^3$ are as previously described and pharmaceutically acceptable salts, thereof are also encompassed by the present invention.

In addition, this invention relates to processes for the preparation of said compounds, compositions employing said compounds and methods for utilizing said compositions as central nervous system depressants.

In addition, compounds of the formula (II)

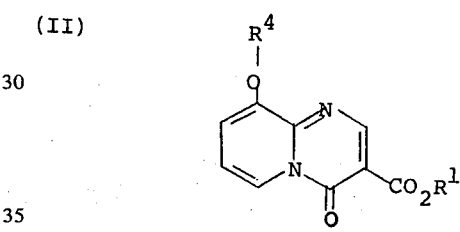

wherein $R^4$ is

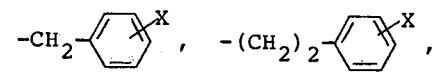

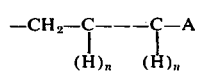

wherein X is hydrogen, halogen, dihalogen, $CF_3$, NC, alkyl of 1 to 4 carbon atoms, carboethoxy, or alkoxy of 1 to 4 carbon atoms, n is zero or one, ————— represents a triple bond ≡ when n is zero and a double bond = when n is one, and A is hydrogen or

$R^1$ is as defined above; and the pharmaceutically acceptable salts thereof, are particularly preferred since they are useful as hypotensive agents as well as central nervous system depressants.

Compounds of the present invention are prepared from dialkyl [(3-hydroxy-2-pyridyl)amino]methylenemalonates via the following cyclization reaction:

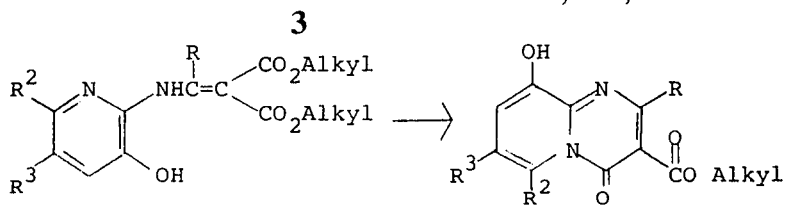

followed by the conversion of the above 9-hydroxy-4-oxopyrido-[1,2-α]pyrimidine to a structure of the following type:

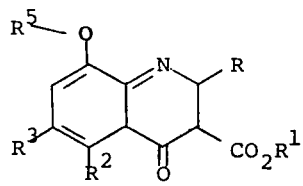

by reacting it with a compound of the formula:

R⁵Z wherein $R^5$ is $R^4$ or a group which is readily converted into $R^4$; Z represents that which is termed chemically as a leaving group, such as bromo, iodo, sulfonate, tosylate, broxylate, quaternary amine, etc.

The cyclization step is accomplished by heating in a high boiling aprotic aromatic or paraffinic solvent, such as diethylbenzene, trichlorobenzene, nitrobenzene, decahydronaphthalene, Dowtherm A (a eutectic mixture of diphenyletherdiphenyl). The reaction utilizing Dowtherm A is carried out at about 220° for a period of between about 5 to about 30 minutes, preferably 15 minutes. However, it appears that during the reaction other products are formed which make purification of the product rather difficult. The compound may be purified but only after recrystallization followed by treatment with an aqueous base, such as sodium hydroxide, potassium hydroxide, etc. A second preferred procedure utilizes diethylbenzene wherein the reaction is carried out initially at about 140° for approximately 1 hour then at about 180° for approximately 1 hour. This preferred procedure yields a readily purifiable product. It also appears that the temperature range is rather critical since no cyclization occurs when solvents boiling considerably below 140° are employed and solvents boiling appreciably above 180° cause the formation of products making isolation very difficult. Thus a temperature of about 140° to about 180° for about 30 minutes to about 4 hours gives rise to the most convenient method for preparing the cyclized compounds of this invention.

The 9-hydroxy group is etherified by reaction with a compund of the type $R^5Z$, wherein $R^5$ and Z are as previously defined and Z is preferably bromo. The reactions are generally carried out in ketonic solvents, such as acetone, methyl ethyl ketone, methyl isobutyl ketone at temperatures of from about 55° to about 120° for 5 to 24 hours in the presence of a base, such as potassium carbonate, potassium bicarbonate, potassium hydrogen phosphate, sodium acetate, potassium acetate, barium acetate, etc.

The essential starting materials utilized in this invention, that is the malonate esters and aminopyridines, are prepared by numerous well known procedures.

Thus the alkoxy alkylene malonate esters are prepared from ortho esters and malonate esters by standard reactions described by R. C. Fuson, W. E. Parkam and L. J. Reed [Journal of Organic Chemistry, 11, 194 (1946)] which is incorporated by reference.

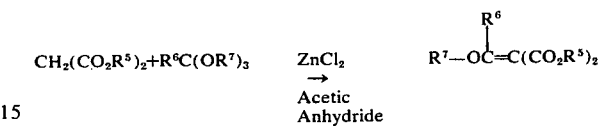

wherein $R^5$ may be lower alkyl, $R^6$ may be hydrogen, lower alkyl or lower alkenyl and $R^7$ may be lower alkyl or lower alkenyl.

The 2-amino-3-pyridinol may be substituted in either the 5- or 6-position, or both, by the substituents $R^2$ and $R^3$ wherein $R^2$ and $R^3$ are halogen, alkyl of 1 to 4 carbons or trifluoromethyl. Examples of some specific substituted 2-amino-3-pyridinols are those corresponding to the compound of formula I wherein the substituents $R^2$ and $R^3$ in the 5- or 6-position are as indicated in the following columns:

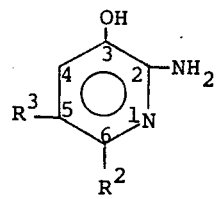

| 5-position | 6-position |
|---|---|
| F | H |
| H | F |
| F | F |
| Cl | H |
| H | Cl |
| Cl | Cl |
| Br | H |
| H | Br |
| Br | Br |
| Cl | F |
| F | Cl |
| Br | F |
| F | Br |
| Br | Cl |
| Cl | Br |
| CH₃ | H |
| H | CH₃ |
| CH₃ | CH₃ |
| F | CH₃ |
| CH₃ | F |
| Cl | CH₃ |
| CH₃ | Cl |
| Br | CH₃ |
| CH₃ | Br |
| F | CF₃ |
| CH₃ | CH₂CH₃ |
| CH₃ | CH₂CH₂CH₃ |
| Cl | —CH₂CHCH₃ |
|  | CH₃ |
| CH₂CH₂CH₂CH₃ | F |
| (CH₃)₃C | Cl |
| CH₂CHCH₃ | Br |
| CH₃ |  |

The 5-, 6-, or 5,6- $R^2$, $R^3$-substituted 2-amino-3-pyridinols may be prepared according to the following reaction sequences, all temperatures being expressed in degrees Centrigrade:

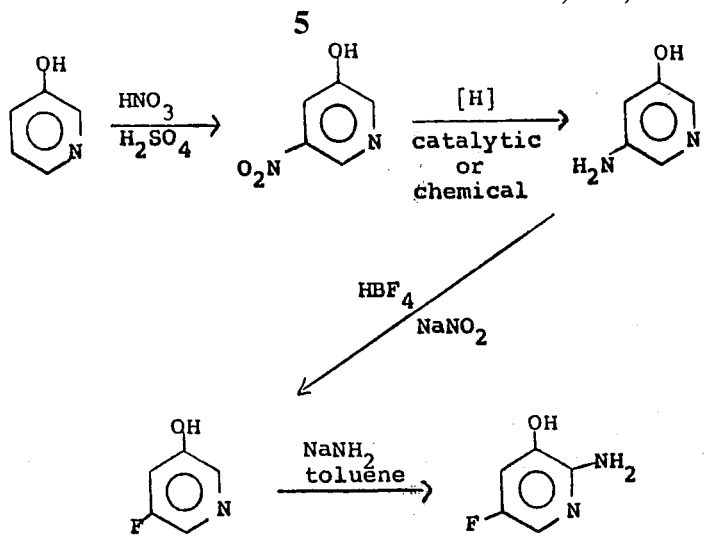
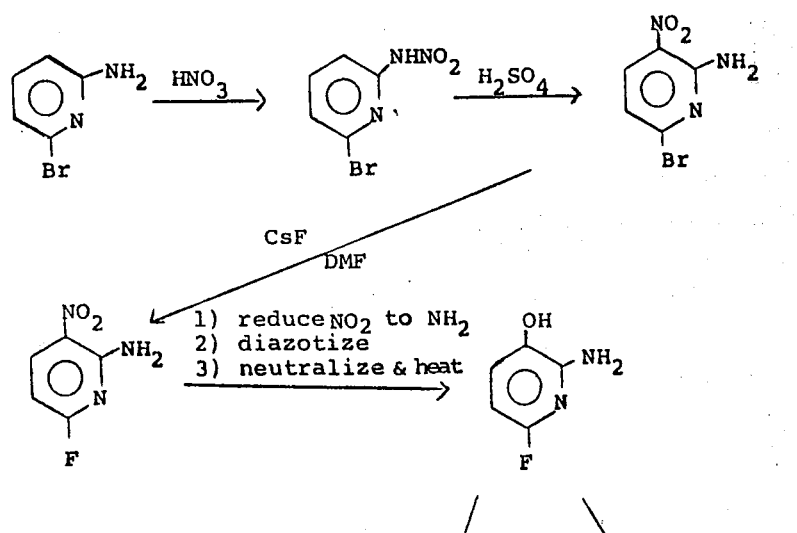
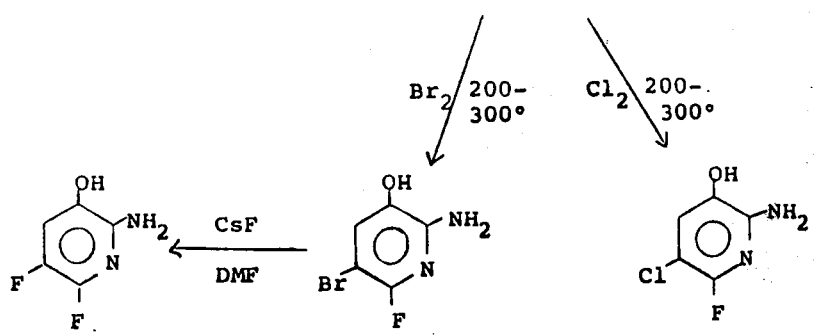
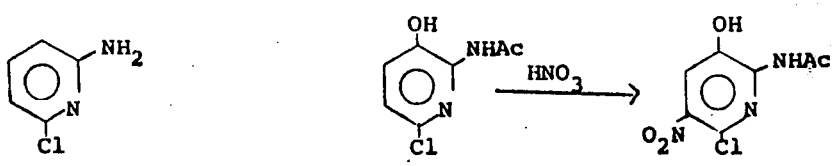
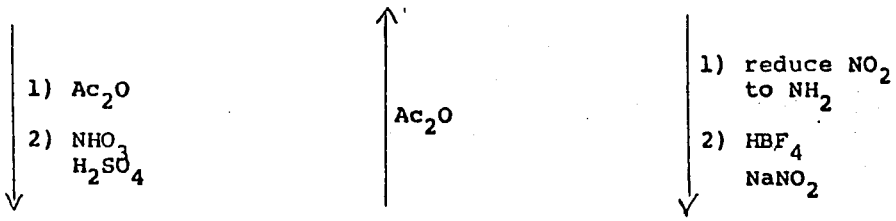

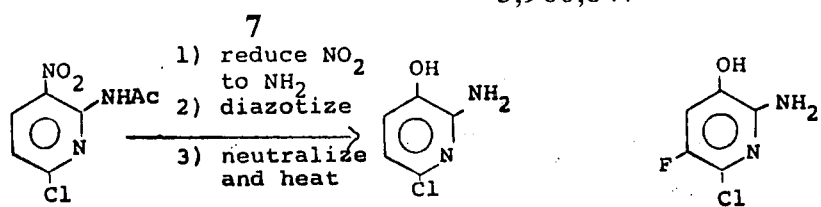
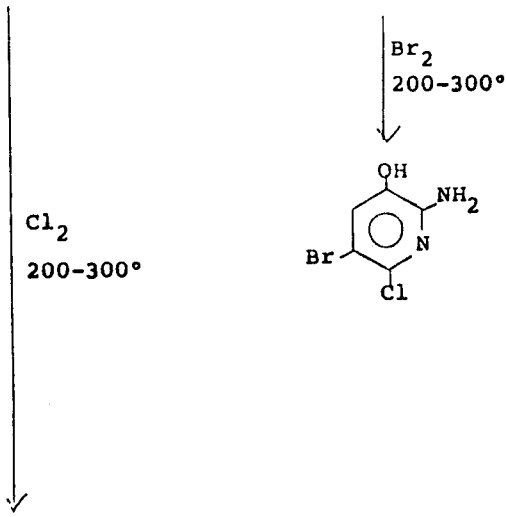
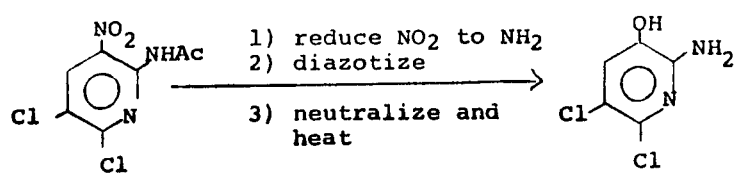
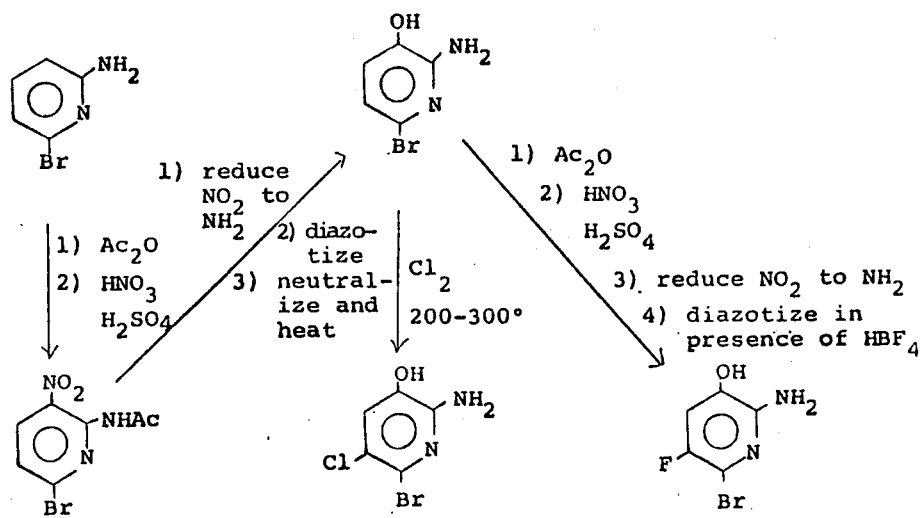
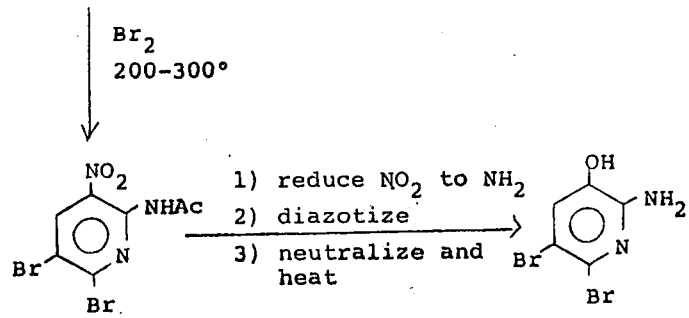

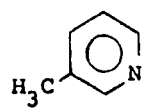
↓ HNO₃
1) reduce NO₂ to NH₂
2) diazotize
3) neutralize and heat
↑ NaNH₂
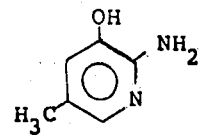
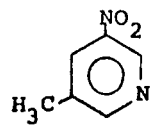 —NaNH₂→ 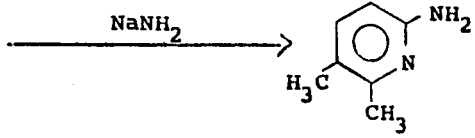
↓ 1) Ac₂O
  2) HNO₃
     N₂SO₄
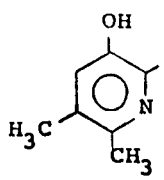 ←── 1) reduce NO₂ to NH₂
2) diazotize
3) neutralize and heat ── 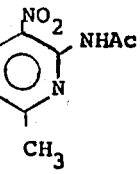
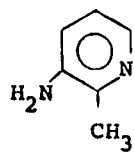 —HBF₄/NaNO₂→ 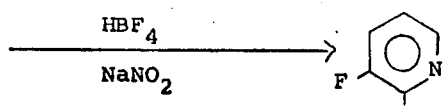
↓ NaNH₂
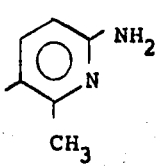 ←── 1) Ac₂O
2) NHO₃
   H₂SO₄
3) reduce NO₂ to NH₂
4) diazotize
5) neutralize and heat ── 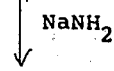

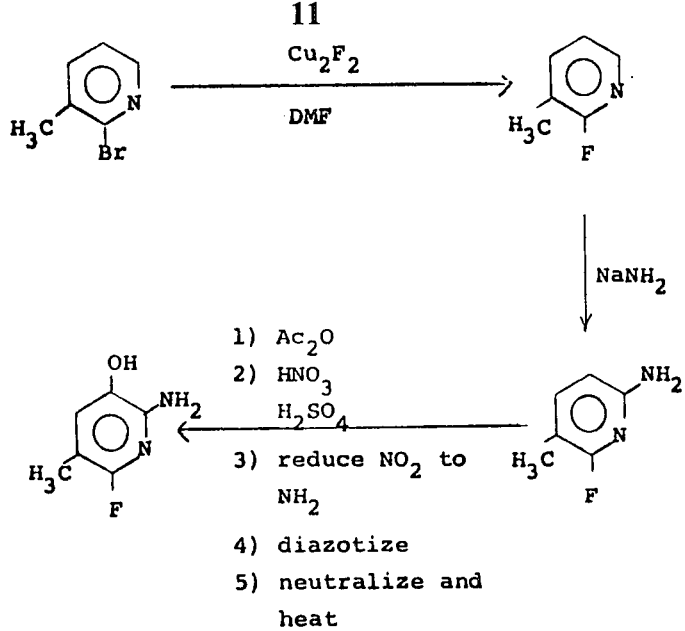
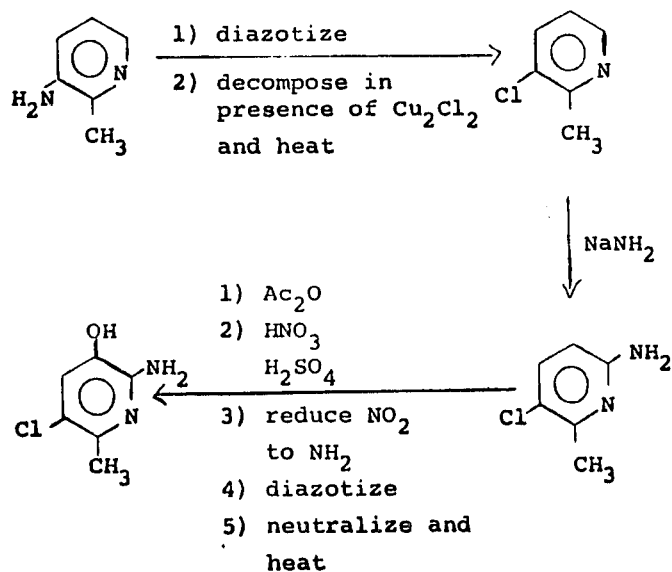
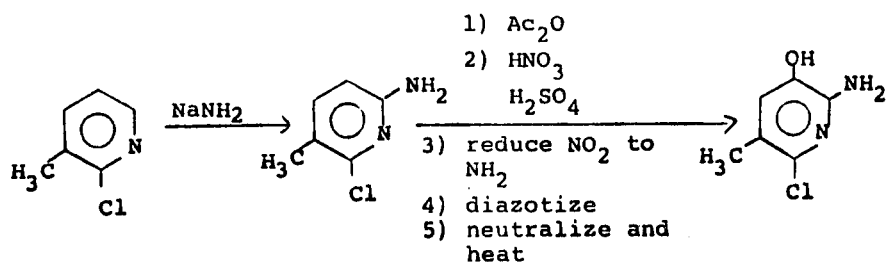
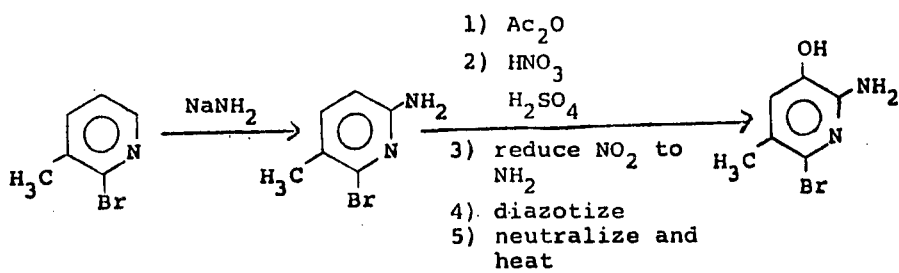

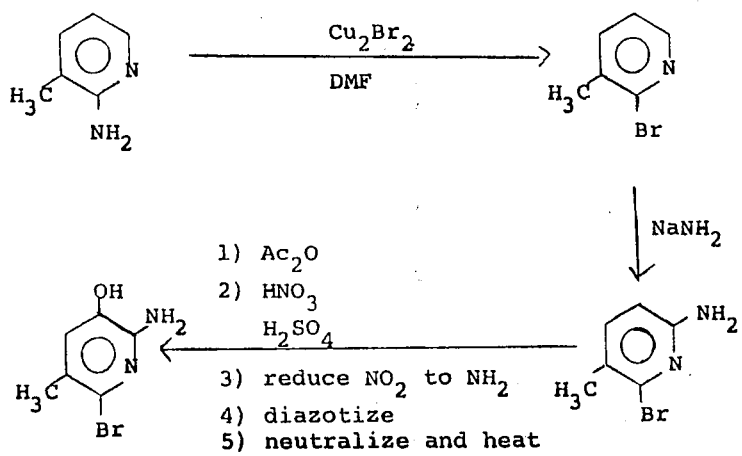

Compounds of this invention find utility in treating mammals, such as dogs, cats, etc. as central nervous system depressants in a dosage range of from about 4 mg. to about 50 mg. per kg, of body weight per day and generally such dosage units are employed so that a total of from about 250 mg. to about 3.5 g., preferably 750 mg. to 2.0 g. of active ingredient for a subject of about 70 kg. body weight are administered in a 24 hour period.

The preferred compounds of this invention, those of formula II, are also hypotensive agents and have a lowering effect on blood pressure. These compounds are useful in the treatment of hypertension in mammalian species, for example, rats, cats, dogs, etc., when administered in amounts ranging from about 8.0 mg. to about 100 mg. per kg. of body weight per day. A preferred dosage regimen for optimum results would be from about 12.0 mg to about 50 mg. per kg, of body weight in a single dose or divided into a series of doses.

The compounds of the present invention in the described dosages for these purposes are intended to be administered orally; however, other routes such has intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course be varied and may conveniently be beween about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 50 and 500 mg. of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples which exemplify preferred embodiments of this invention.

EXAMPLE 1

[(3-Hydroxy-2-pyridyl)amino]methylenemalonic Acid, Diethyl Ester

A blended mixture of 65.0 g of 2-amino-3-pyridinol and 110.0 g of diethyl ethoxymethylenemalonate was placed in an oil bath heated at 130°–140°. The internal temperature reached ca 110° and remained in this range as the mxiture fused and then solidified. The heating period was 1 hour and 140 g of crude product is obtained.

The crude fusion product (10g) was shaken well with 200 ml of chloroform and filtering removing a considerable amount of undissolved material. The dark colored chloroform solution when washed with saturated aqueous sodium bicarbonate solution, dried and concentrated to give 6.2 g of yellow solid, m.p. 152°–152°–156°(dec.). One recrystallization from 250 ml of acetonitrile gave 3.24 g of material, m.p. 175°–177°. A second recrystallization from 60 ml of acetontrile gave 2.6 g of the product, m.p. 180.5°–181.5°.

EXAMPLE 2

[(5-Chloro-3-hydroxy-2-pyridyl)amino]methylenemalonic Acid, Diethyl Ester

By substituting 5-chloro-2-amino-3-pyridinol for the 2-amino-3-pyridinol in Example 1, there is obtained the named compound.

EXAMPLE 3

[(6-Trifluoromethyl-3-hydroxy-2-pyridyl)amino]-methylene-malonic Acid, Diethyl Ester By substituting 6-trifluoromethyl-2-amino-3-pyridinol for the 2-amino-3-pyridinol in Example 1, there is obtained the named compound.

EXAMPLE 4

[(5-Fluoro-6-methyl-3-hydroxy-2-pyridyl)amino]-methylene-malonic Acid, Diethyl Ester By substituting 5-fluoro-6-methyl-2-amino-3-pyridinol for the 2-amino-3-pyridinol in Example 1, there is obtained the named compound.

EXAMPLE 5

[(3-Hydroxy-2-pyridyl)amino]ethylidenemalonic Acid Dimethyl Ester

By substituting dimethyl ethoxyethylidenemalonate for the diethyl ethoxymethylenemalonate in Example 1, there is obtained the named compound.

EXAMPLE 6

[(3-Hydroxy-2-pyridyl)amino]benzylidenemalonic Acid, Diethyl Ester

By substituting diethyl ethoxybenzylidenemalonate for the diethyl ethoxymethylenemalonate in Example 1, there is obtained the named compound.

EXAMPLE 7

9-Hydroxy-4-oxo-4H-pyrido[1,2-α]pyrimidine-3-carboxylic Acid, Ethyl Ester a. Dowtherm A Process: To 750 ml of Dowtherm A, preheated to 220°, is added 89.0 g of the recrystallized product from [(3-hydroxy-2-pyridyl)amino]methylenemalonic acid, diethyl ester in portions, as rapidly as possible. The temperature drops to about 200° but is restored quickly to 220° by additional heat being applied. Heating is terminated after 15 minutes, the mixture is cooled, and poured into 4 liters of petroleum ether. The solid that separates is filtered and air-dried. Recrystallization from ethyl acetate, (1.0 g/40 ml), returned 22.0 g, m.p. 179°–180°.

Anal. Calc. for $C_{11}H_{10}O_4N_2$: C, 56.41; H, 4.31; N, 11.96. Found: C, 55.60; H, 4.65; N, 13.54.

The material obtained from ethyl acetate was recrystallized from toluene to give material, m.p. 180°–181°.

Found: C, 54.87; H, 465; N, 14.29. % ethyl

A mixture of 5.0 g of the ethyl acetate recrystallized material and 50 ml of 25 aqueous sodium hydroxide was stirred at room temperature for 15 minutes, filtered from a dark solid, and the filtrate adjusted to pH 5.5. The sticky mass that separated was extracted into chloroform, and the chloroform solution as washed with 10 ml of aqueous saturated sodium chloride, dried, and concentrated to give 3.5 g of solid, m.p. 149°–173°. Recrystallization from 75 ml of ethyle acetate gave 1.41 g of 9-hydroxy-4-oxo-4H-pyrido[1,4-α]pyrimidine-3-carboxylic acid, ethyl ester, m.p. 175°–177°. The overall yield from 2-amino-3-pyridinol was 7%.

Anal. Calcd for 9-hydroxy-4-oxo-4H-pyrido[14,-α]pyridmidine-3-carboxylic acid, ethyl ester: C, 56.41; H, 4.31; N, 11.96. Found: C, 56.43; H, 4.59; N, 12.10.

The ir and pmr spectra confirmed the assigned structure.

b. Diethylbenzene Process: A mixture of 66.0 g of 2-amino-3-pyridinol, 220.0 g of diethyl ethoxymethylenemalonate, and 1.0 liter of diethylbenzene was heated so that the internal temperature reached 140° in 1 hour, was kept for 1 hour at 140°, then heated so that the temperature rose to 180° in 1 hour, and then kept 1 hour at 180°. During this entire heating period, 50 ml. of distillate was collected. The solution was allowed to cool spontaneously, was cooled at 0°, filtered, and the solid washed with diisopropyl ether to give 130.0 g of product, after drying at 56° in vacuo. The m.p. was 175°–177° and a mixture m.p. with the product isolated in (a) above was 175°–177°. The ir and pmr spectra of the two samples were superimposable. The yield was 93%.

Anal. Found: C, 56.68; H 4.56; N, 12.10.

EXAMPLE 8

2-Methyl-6-chloro-9-hydroxy-4-oxo-4H-pyrido[1,2-α]pyrimidine-3-carboxylic Acid, Ethyl Ester By substituting [(6-chloro-3-hydroxy-2-pyridyl)amino] ethylidenemalonic acid, diethyl ester for the [(3-hydroxy-2-pyridyl)amino]methylenemalonic acid, diethyl ester, there is obtained the named compound.

EXAMPLE 9

2-Phenyl-6-fluoro-7-methyl-9-hydroxy-4-oxo-4H-pyrido[1,2-α]pyrimidine-3-carboxylic Acid, n-BUTYL Ester By substituting [(5-methyl-6-fluoro-3-hydroxy-2-pyridyl)amino]benzylidenemalonic acid, di-n-butyl ester for the [(3-hydroxy-2-pyridyl)amino]methylenemalonic acid, diethyl ester, there is obtained the named compound.

EXAMPLE 10

7-Trifluoromethyl)-9-hydroxy-4-oxo-4H-pyrido[1,2-α]pyrimidine-3-carboxylic Acid, Ethyl Ester By substituting [[5-(trifluoromethyl)-3-hydroxy-2-pyridyl]amino]methylenemalonic acid, diethyl ester for the [(3-hydroxy-2-pyridyl)amino]methylenemalonic acid, diethyl ester, there is obtained the named compound.

EXAMPLE 11

9-[(2-Bromo-4-chlorobenzyl)oxy]-4-oxo-4H-pyrido[1,2-α]pyrimidine-3-carboxylic Acid, Ethyl Ester To 4.7 g of 9-hydroxy-4-oxo-4H-pyrido[1,2-α]pyrimidine-3-carboxylic acid, ethyl ester, 7.2 g of 2-bromo-4-chlorobenzyl bromide and 200 ml of ethyl methyl ketone is added 3.3 g of anhydrous potassium carbonate. The mixture is stirred and heated under reflux for 18 hours, cooled and filtered. The filtrate is concentrated in vacuo to give 9.5 g of a viscous gum. This is dissolved in 100 ml of chloroform and the chloroform solution is washed with 60 ml of 5% aqueous potassium hydroxide. The chloroform solution is separated, washed with 25 ml of saturated aqueous sodium chloride, dried, and concentrated to give 7.4 g of a viscous gum. This gum is crystallized in 250 ml of 1:1 toluene-Skellysolve E to give 3.6 g of green crystals that sinter at 155° and melt at 162°–165°. A second recrystallization from 225 ml of 2-propanol gives the yellow crystalline named product, m.p. about 167°–169°. The yield is about 2.95 g.

EXAMPLE 12

9-[(o-Bromobenzyl)oxy]-4-oxo-4H-pyrido[1,2-α]pyrimidine-3-carboxylic Acid, Ethyl Ester To a solution of 4.7 g of 9-hydroxy-4-oxo-4H-pyrido[1,2-α]pyrimidine-3-carboxylic acid, ethyl ester, 7.2 g of o-bromobenzyl bromide, and 200 ml of ethyl methyl ketone is added 4.0 g of anhydrous potassium bicarbonate, and the mixture is stirred and heated under reflux for 18 hours. The cooled mixture is filtered and the filtrate is concentrated in vacuo to give a solid residue. This is recrystallized successively from 1:1 toluene-skellysolve and from 2-propanol to give about 6.9 g of the named product, m.p. about 164°–166°.

EXAMPLE 13

9-(Allyloxy)-4-oxo-4H-pyrido[1,2-α]pyrimidine-3-carboxylic Acid, Ethyl Ester

By substituting 4.4 g of allyl bromide for the 2-bromo-4-chlorobenzyl bromide in Example 11, there is obtained by that procedure, about 1.4 g of the named product, m.p. about 155°–157°.

EXAMPLE 14

4-Oxo-9-(2-propynyloxy)-4H-pyrido[1,2-α pyrimidine-3-carboxylic Acid, Ethyl Ester To 4.7 g of 9-hydroxy-4-oxo-4H-pyrido[1,2-α]pyrimidine-3-carboxylic acid, ethyl ester, 4.4 g of propargyl bromide, and 200 ml of methyl isobutyl ketone is added 3.9 g of anhydrous dipotassium hydrogen phosphate and the mixture is stirred and heated under reflux for 18 hours. The cooled mixture is filtered and the filtrate concentrated in vacuo. The residue, 5.4 g., is recrystallized from toluene to give about 4.4 g of the named product, m.p. about 146°–148°.

EXAMPLE 15

4-Oxo-9-(phenethyloxy)-4H-pyrido[1,2-α]pyrimidine-3-carboxylic Acid, Ethyl Ester, Maleate By substituting 5.6 g of phenethyl bromide for the propargyl bromide in Example 14, there is obtained the product as an oil. To the oil, 3.4 g, in 30 ml of acetonitrile, at the boiling point, is added a solution of 1.16 g of maleic acid in 12 ml of boiling acetonitrile, with rapid agitation; on cooling, a crystalline product separates and is recrystallized from 2-propanol to give the named product.

EXAMPLE 16

9-[(o-chlorobenzyl)oxy]-4-oxo-4H-pyrido[1,2-α]pyrimidine-3-carboxylic Acid, Ethyl Ester By substituting 4.2 g of o-chlorobenzyl bromide for the propargyl bromide in Example 14, there is obtained the named product.

EXAMPLE 17

4-Oxo-9-[[p-(trifluoromethyl)benzyl]oxy]-4H-pyrido 1,2-α]pyrimidine-3-carboxylic Acid, Ethyl Ester To 4.7 g of 9-hydroxy-4-oxo-4H-pyrido[1,2-α]pyrimidine-3-carboxylic acid, ethyl ester, 4.8 g of p-(trifluoromethyl) benzyl bromide, 200 ml of methyl n-propyl ketone is added 1.7 g of anhydrous sodium acetate. The mixture is stirred and heated under reflux for 18 hours and then worked up as in Example 11 to give the named product.

EXAMPLE 18

9-[[(o-carboethoxy)benzyl]oxy]-4-oxo-4H-pyrido[1,2-α]-pyrimidine-3-carboxylic Acid, Ethyl Ester, Hydrobromide To a solution of 5.0 g of ethyl α-bromo-o-toluate, 4.7 g of 9-hydroxy-4-oxo-4H-pyrido[1,2-α]pyrimidine-3-carboxylic acid, ethyl ester, and 200 ml of ethyl methyl ketone is added 3.9 g of anhydrous dipotassium hydrogen phosphate and the mixture stired and heated under reflux for 18 hours. The cooled mixture is filtered, and the filtrate is concentrated in vacuo to give a semi-solid product. To this product, 3.9 g, in 10 ml of acetic acid is added a solution of 0.81 g of hydrogen bromide in 4 ml of glacial acetic acid, dropwise, with agitation. The crystalline product that separates is filtered, washed with anhydrous ether, and recrystallized from acetonitrile to give the named product.

EXAMPLE 19

9-[(o-Methylbenzyl)oxy]-4-oxo-4H-pyrido[1,2-α]pyrimidine-3-carboxylic Acid, Ethyl Ester By substituting 3.7 g of o-methylbenzyl bromide for the propargyl bromide in Example 14, there is obtained the named product.

EXAMPLE 20

9-(cinnamyloxy)-4-oxo-4H-pyrido[1,2-α]pyrimidine-3-carboxylic Acid, Ethyl Ester

By substituting 4.0 g of cinnamyl bromide for the propargyl bromide in Example 14, there is obtained the named product.

EXAMPLE 21

9-[(o-Nitrobenzyl)oxy]-4-oxo-4H-pyrido[1,2-α]-pyrimidine-3-carboxylic Acid, Ethyl Ester By substituting 4.4 g of o-nitrobenzyl bromide for the propargyl bromide in Example 14, there is obtained the named product.

EXAMPLE 22

9-[(o-Aminobenzyl)oxy[-4-oxo-4H-pyrido[1,2-α]pyrimidine-3-carboxylic Acid, Ethyl Ester, Dihydrochloride The product from Example 21, 3.70 g in 100 ml of 2-propanol, and 1.0 g of 5% palladium on carbon catalyst, is reduced at ambient temperature and 50 psi of hydrogen. Reduction is complete in 15 minutes. The mixture is filtered, the filtrate is concentrated to a volume of 15 ml, cooled, and stirred during the addition of 10 ml of 2N ethereal hydrogen chloride. The precipitated crystalline solid is filtered and recrystallized from 2-propanol to give the named product.

EXAMPLE 23

9-[[(o-isocyanido)benzyl]oxy]-4-oxo-4H-pyrido[1,2-α]-pyrimidine-3-carboxylic Acid, Ethyl Ester a. The product from Example 22, 4.4 g, 1.32 g of anhydrous sodium formate, and 25 ml of 98–100% formic acid are heated under reflux for 2 hours, and then concentrated to dryness in vacuo. The residual solid is stirred with 25 ml of water, filtered, and then is recrystallized from 2-propanol to give 9-[[(o-formamido)benzyl]oxy]-4-oxo-4H-pyrido[1,2-α]pyrimidine-3-carboxylic acid, ethyl ester.

b. To the product from (a), 4.4. g. in 200 ml of methylene chloride, at 5°, is added 1.0 g of phosgene in 10 ml of methylene chloride, dropwise. The temperature is maintained at 5° for 1 hour, and then 5 ml of anhydrous pyridine is added, dropwise, not allowing the temperature to rise above 5°. When the exothermic reaction has subsided, the mixture is allowed to come to room temperature and kept for 18 hours at room temperature. The mixture is filtered, and the filtrate concentrated in vacuo to give a solid residue. Recrystallization from cyclohexane gives 9-[[(o-isocyanido)benzyl]oxy]-4-oxo-4H-pyrido-[1,2-α]pyrimidine-3-carboxylic acid, ethyl ester.

EXAMPLE 24

9-[(2-Bromo-4-chlorobenzyl(oxy]-4-oxo-4H-pyrido[1,2-α]PYRIMIDINE-3-carboxylic Acid, Potassium Salt A solution of 4.37 g of the product from Example 1 in 50 ml of 95% ethanol and 10 ml of 1N aqueous potassium hydroxide is kept at 20 for 1 hour and then concentrated in vacuo, not allowing the temperature to exceed 30°. The residual solid is redissolved in 25 ml of double distilled water and the solution lyophilized to give the named product as a fluffy white amorphous powder.

What is claimed is:
1. A compound of the formula:

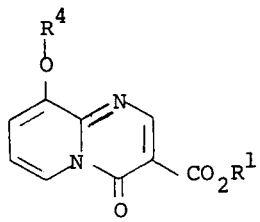

wherein $R^1$ is selected from the group consisting of hydrogen and straight or branched chain alkyl of from 1 to 4 carbon atoms; and $R^4$ is selected from the group consisting of benzyl, phenethyl, substituted benzyl or phenethyl, and

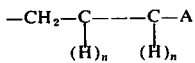

wherein $n$ is zero or one, ——— represents a triple bond ≡ when $n$ is zero and a double bond = when $n$ is one, A is hydrogen, phenyl, or substituted phenyl, and said phenyl, benzyl and phenethyl substituent is selected from the group consisting of mono (halogen), di(halogen), mono(carboethoxy), mono(trifluoromethyl), mono(alkyl) of 1 to 4 carbon atoms, mono(alkoxy) of 1 to 4 carbon atoms, and mono(NC); and a pharmaceutically acceptable salt thereof.

2. The compound of claim 1 wherein $R^4$ is benzyl or substituted benzyl wherein said substituent is selected from the group consisting of mono(halogen), di(halogen), mono-(carboethoxy), mono(trifluoromethyl), mono(alkyl) of 1 to 4 carbon atoms, mono(alkoxy) of 1to 4 carbon atoms, and mono(NC).

3. The compound of claim 2 having the name 9-[(2-bromo-4-chlorobenzyl)oxy]-4-oxo-4H-pyrido[1,2-α]pyrimidine-3-carboxylic acid, ethyl ester.

4. The compound of claim 2 having the name 9-[(o-bromobenzyl)oxy]-4-oxo-4H-pyrido[1,2-α]pyrimidine-3-carboxylic acid, ethyl ester.

5. The compound of claim 2 having the name 9-[(o-chlorobenzyl)oxy]-4-oxo-4H-pyrido[1,2-α]pyrimidine-3-carboxylic acid, ethyl ester.

6. The compound of claim 2 having the name 4-oxo-9-[[(p-trifluoromethyl)benzyl]oxy]-4H-pyrido[1,2-α]pyrimidine-3-carboxylic acid, ethyl ester.

7. The compound of claim 2 having the name 9-[[(o-carboethoxy)benzyl]oxy]-4-oxo-4H-pyrido[1,2-α]pyrimidine-3-carboxylic acid, ethyl ester, hydrobromide.

8. The compound of claim 2 having the name 9-[(o-methylbenzyl)oxy]-4-oxo-4H-pyrido[1,2-α]pyrimidine-3-carboxylic acid, ethyl ester.

9. The compund of claim 2 having the name 9-[[(o-isocyanido)benzyl]oxy]-4-oxo-4H-pyrido[1,2-α]pyrimidine-3-carboxylic acid, ethyl ester.

10. The compound of claim 2 having the name 9-[(2-bromo-4-chlorobenzyl)oxy]-4-oxo-4H-pyrido[1,2-α]pyrimidine-3-carboxylic acid, potassium salt.

11. The compound of claim 1 having the name 4-oxo-9-(phenethyloxy)-4H-pyrido[1,2-α]pyrimidine 3-carboxylic acid, ethyl ester, maleate.

12. The compound of claim 1 wherein $R^4$ is

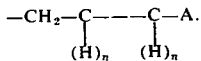

13. The compound of claim 12 having the 4-oxo-9-(2-propynyloxy)-4H-pyrido[1,2-α]pyrimidine-3-carboxylic acid, ethyl ester.

14. The compound of claim 12 having the name 9-(allyloxy)-4-oxo-4H-pyrido[1,2-α]pyrimidine-3-carboxylic acid, ethyl ester.

15. The compound of claim 12 having the name 9-(allyloxy)-4-oxo-4H-pyrido[1,2-α]pyrimidine-3-carboxylic acid, ethyl ester.

* * * * *

UNITED STATES PATENT AND TRADEMARK OFFICE
CERTIFICATE OF CORRECTION

PATENT NO. : 3,960,847
DATED : June 1, 1976
INVENTOR(S) : Yale

It is certified that error appears in the above-identified patent and that said Letters Patent are hereby corrected as shown below:

Col. 1, line 61, "atoms", second occurrence, should read --atom--.

Col. 1, line 62, "atoms." should read --atom--.

Col. 2, line 5, "slats" should read --salts--.

Col. 13, line 23, "kg," should read --kg.--.

Col. 13, line 57, "of course" should read --of course,--.

Col. 14, line 55, "filtering" should read --filtered--.

Col. 14, line 59, "15-" should be deleted.

Col. 14, line 60, "2°-" should be deleted.

Col. 15, line 52, "% ethyl" should be cancelled.

Col. 15, line 55, "25" should read --2%--.

Col. 15, line 62, "ethyle" should read --ethyl--.

Col. 17, line 29, "[1,2-α" should read --[1,2-α]--.

Col. 17, line 64, "1,2-α]" should read --[1,2-α]--.

Col. 18, line 15, "stired" should read --stirred--.

Col. 18, line 49, "oxy[" should read --oxy]--.

Col. 19, line 20, "chlorobenzoyl(" should read --chlorobenzoyl)--.

UNITED STATES PATENT AND TRADEMARK OFFICE
CERTIFICATE OF CORRECTION

PATENT NO. : 3,960,847

DATED : June 1, 1976

INVENTOR(S) : Yale

It is certified that error appears in the above-identified patent and that said Letters Patent are hereby corrected as shown below:

Col. 20, line 38, "pyrimidine 3-car-" should read -- pyrimidine-3-car- --.

Col. 20, line 52, "allyloxy" should read --cinnamyloxy--.

Signed and Sealed this

Fifth Day of October 1976

[SEAL]

Attest:

RUTH C. MASON
Attesting Officer

C. MARSHALL DANN
Commissioner of Patents and Trademarks